United States Patent
Hakenberg

(10) Patent No.: US 11,364,815 B2
(45) Date of Patent: Jun. 21, 2022

(54) CHARGING CABLE SYSTEM WITH COOLING

(71) Applicant: PAXOS CONSULTING & ENGINEERING GMBH & CO, KG., Langenfeld (DE)

(72) Inventor: Peter Hakenberg, Solingen (DE)

(73) Assignee: Paxos Consulting & Engineering GMBH & CO, KG, Langenfeld (DE)

( * ) Notice: Subject to any disclaimer, the term of this patent is extended or adjusted under 35 U.S.C. 154(b) by 142 days.

(21) Appl. No.: 16/639,981

(22) PCT Filed: Jul. 4, 2018

(86) PCT No.: PCT/EP2018/068109
§ 371 (c)(1),
(2) Date: Feb. 18, 2020

(87) PCT Pub. No.: WO2019/008047
PCT Pub. Date: Jan. 10, 2019

(65) Prior Publication Data
US 2020/0317071 A1     Oct. 8, 2020

(51) Int. Cl.
*H02J 7/00*     (2006.01)
*H02J 7/14*     (2006.01)
(Continued)

(52) U.S. Cl.
CPC ............... *B60L 58/26* (2019.02); *B60L 53/16* (2019.02); *B60L 53/18* (2019.02); *B60L 53/302* (2019.02)

(58) Field of Classification Search
USPC ......................................................... 320/109
See application file for complete search history.

(56) References Cited

U.S. PATENT DOCUMENTS

| 10,029,575 | B2 * | 7/2018 | Remisch | ............... H01R 13/005 |
| 2010/0089669 | A1 * | 4/2010 | Taguchi | .................. B60L 53/18 |
| | | | | 180/65.1 |

(Continued)

FOREIGN PATENT DOCUMENTS

| DE | 102010007975 A1 | 8/2011 |
| DE | 102010050562 | 4/2012 |

(Continued)

OTHER PUBLICATIONS

The International Search Report and the Written Opinion for PCT/EP2018/068109, dated Sep. 24, 2018, EPO, Rijswijk, The Netherlands.

(Continued)

*Primary Examiner* — Alexis B Pacheco
(74) *Attorney, Agent, or Firm* — M&B IP Analysts, LLC

(57) ABSTRACT

The present disclosure relates to a charging cable system, having a charging cable with a plurality of individual conductors running within the charging cable to transfer a charging current and with a cable connection part for connecting the charging cable to the stored energy source of an electrically driven vehicle. According to the present disclosure, at least one cooling channel runs within the charging cable, in which cooling channel a cooling medium is guided to the cable connection part, and in the cable connection part valve means are provided for returning the cooling medium to the charging cable. The charging cable is designed such that after this return, the cooling medium flows at least partially around the individual conductors.

20 Claims, 3 Drawing Sheets

(51) Int. Cl.
    *B60L 58/26*    (2019.01)
    *B60L 53/18*    (2019.01)
    *B60L 53/302*   (2019.01)
    *B60L 53/16*    (2019.01)

(56) References Cited

U.S. PATENT DOCUMENTS

| | | | | |
|---|---|---|---|---|
| 2012/0043935 | A1* | 2/2012 | Dyer | B60L 55/00 |
| | | | | 320/109 |
| 2015/0217654 | A1* | 8/2015 | Woo | B60L 53/302 |
| | | | | 320/109 |
| 2015/0306974 | A1* | 10/2015 | Mardall | H01M 10/656 |
| | | | | 320/150 |
| 2016/0089996 | A1* | 3/2016 | Sugiura | B60L 53/16 |
| | | | | 320/109 |
| 2016/0221458 | A1* | 8/2016 | Lopez | B60L 53/302 |
| 2017/0096073 | A1 | 4/2017 | Mardall et al. | |
| 2018/0198323 | A1* | 7/2018 | Widmer | B60L 53/124 |
| 2018/0290558 | A1* | 10/2018 | Myers | B60K 11/06 |
| 2019/0315239 | A1* | 10/2019 | Beimdieck | H01R 13/533 |
| 2020/0317070 | A1* | 10/2020 | Fuhrer | H01B 9/02 |

FOREIGN PATENT DOCUMENTS

| | | |
|---|---|---|
| DE | 102015112347 A1 | 2/2017 |
| DE | 102015114133 A1 | 3/2017 |
| WO | 2017194361 A1 | 11/2017 |

OTHER PUBLICATIONS

Office Action from corresponding European Patent Application No. 18738278.3. dated Feb. 24, 2021.

* cited by examiner

CHARGING CABLE SYSTEM WITH COOLING

CROSS-REFERENCE TO RELATED APPLICATIONS

This application claims priority under 35 U.S.C. § 371 to the International Application No. PCT/EP2018/068109, filed Jul. 4, 2018, and to the German Application No. 10 2017 115 241.5, filed Jul. 7, 2017, now pending, the contents of which are hereby incorporated by reference.

The present disclosure relates to a charging cable system in accordance with the preamble of claim 1, having a charging cable with multiple single lines running inside the charging cable for transferring a charging current and with a cable connecting part for connecting the charging cable to the energy store of an electrically operable vehicle.

Charging plugs for electrically drivable vehicles are known from the prior art that are designed for connection to a corresponding socket. When an energy store of a motor vehicle is charged, the charging plug, which is in the form of a power plug contact, heats up. The heating of the plug contact should be limited to a specific temperature increase, however. In order to keep to a limited temperature increase of this kind, the plug connector geometries, which are standardized in the main, only allow the use of charging currents at a level that does not allow rapid charging of a vehicle, however. In particular in the event of intermittent charging of an energy store, higher charging currents are necessary for specific periods in order to charge the energy store in a short time. This can lead to temporary heating of the charging plug. To solve this problem, for example DE 10 2015 100 347 A1 discloses an electrical connecting body that has a cooling fluid duct for cooling the connecting body with a cooling fluid. However, this cannot prevent heating of the charging cable as a whole.

Since the acceptance and spread of electric vehicles is also dependent on the charging time, there is thus a need for charging plugs and charging cables that allow the fastest charging possible without increasing the standardized dimensions. It is therefore an object of the present disclosure to provide a charging cable system that allows increased charging currents with limited heating.

According to the present disclosure, this object is achieved by a charging cable system in accordance with independent claim 1. Advantageous developments of the charging cable system emerge from subclaims 2-10.

It should be pointed out that the features individually listed in the claims can be combined with one another in any technically meaningful manner and demonstrate further configurations of the present disclosure. The description characterizes and specifies the present disclosure additionally, in particular in association with the figures.

The charging cable system according to the present disclosure has a charging cable with multiple single lines running inside the charging cable for transferring a charging current. The single lines are multiple power lines for the charging current, e.g. L1, L2, L3, a neutral line N and a protected line PE. Further, there may be in the charging cable a pilot signal line CP (control pilot) for transferring pilot signals and what is known as a plug present line (PP), which can be used by an electric vehicle to indicate a charging station whether or not a charging cable having a plug is plugged in.

The charging cable further has a cable connecting part for connecting the charging cable to the energy store of an electrically operable vehicle. This connection is made indirectly via multiple components. In particular, this cable connecting part is in the form of a charging plug or charging socket and can be temporarily connected to a corresponding connecting body on an electric vehicle. To this end, the cable connecting part and the connecting body of the electric vehicle are typically plugged into one another, as a result of which a connection is able to be made between the lines of the charging cable and the corresponding lines of the vehicle. Inside the vehicle, lines are then routed to the energy store of the vehicle, i.e. to one or more storage batteries and possibly an associated battery management system (BMS). This connection is referred to generally as a connecting line for the purpose of explaining the present disclosure.

According to the present disclosure, there runs inside the charging cable at least one cooling duct in which a cooling medium is carried to the cable connecting part. This cooling duct therefore serves as a feed for a cooling medium, the cooling duct being formed by a hose inside the charging cable, for example. There is furthermore provision in the cable connecting part for valve means for returning the cooling medium to the charging cable, the charging cable being embodied such that the cooling medium flows around at least part of the single lines after this return. This produces a closed circulation for the cooling medium, which is thus able to cool the charging cable and the cable connecting part. The cooling limits the temperature increase of the charging cable and the cable connecting part during the charging process, which advantageously results in high charging currents and hence rapid charging being possible without an increase in standardized dimensions of a cable connecting part.

In one embodiment of the present disclosure, at least two of the single lines are twisted or stranded together inside the charging cable. In particular, the lines for the actual charging power are twisted together, whereas lines for signal transfer or control are not involved in the twist. Twisting the single lines renders the charging cable more flexible, more current can be transferred for the same cable cross section and the individual lines are better flushed by the cooling medium and hence better cooled. The cooling medium flushes the twisted single lines.

To achieve good cooling for the single lines, the respective insulation thereof can further be embodied in contoured fashion in cross section. By way of example, a single line can have a substantially round cross section provided with longitudinal grooves. The cooling medium flows through these longitudinal grooves, the surface area for transferring heat to the cooling medium being increased and the longitudinal grooves ensuring good heat dissipation through convection.

The cooling medium is preferably electrically nonconductive or insulated from current flow inside the charging cable. The cooling medium used can be any fluids suitable for cooling the single lines of the cable. With the suitable choice of cooling medium, said cooling medium can also serve as lubricant between the single lines, as a result of which the single lines slide over one another more easily when the charging cable is flexed. The cooling medium used can be for example compressed air, water or an oil. In one embodiment of the present disclosure, the cooling medium is chosen from a group of fluids whose viscosity increases when heated. As the heating increases, the cooling medium then becomes less viscous, improving the cooling of regions that are becoming hot.

In one embodiment of the present disclosure, there is provision for the valve means of the cable connecting part merely to serve to return the cooling medium from the supply hose back to the charging cable. In another embodiment, however, there is provision for cooling medium also to be able to be provided to the electric vehicle when necessary in order to cool lines and in particular an energy store inside the vehicle. The valve means of the cable connecting part are thus designed such that they can carry a cooling medium either back to the charging cable or to a vehicle. The cooling medium is then carried to a vehicle through the cable connecting part and the corresponding connecting body of the vehicle. After passing through the applicable components of the vehicle, the heated cooling medium is carried back through the connecting body of the vehicle to the cable connecting part and the charging cable. To this end, there is provision for applicable valve means at least in the cable connecting part, but the connecting body of the vehicle can also have valve means for this purpose.

Connecting the cooling circulation of the charging cable to a vehicle is important in particular for rapid charging. However, use of vehicle cooling can also be advantageous when vehicles are in the sun or an underground garage, since the vehicles cannot release additional charging heat to the outside in these situations. As an alternative to cooling the vehicle, the charging column could also lower the charging power, however.

In one embodiment of the present disclosure, there is thus provision for the cable connecting part to be temporarily connectable to a connecting body of a vehicle, wherein this connecting body is connected to an energy store of the vehicle for the purpose of transferring a charging current via an electrical connecting line. In this embodiment, the entire system comprising charging cable, cable connecting part, connecting body of the vehicle and connecting line to the energy store of the vehicle is regarded as a charging cable system for the purposes of the present disclosure. The valve means of the cable connecting part are then in a form such that they can route the cooling medium either back to the charging cable or through the cable connecting part to the connecting body of the vehicle. This is accomplished by using one or more ball valves or double ball valves. The connecting body is then accordingly in a form such that it can carry heated cooling medium from the vehicle through the connecting body back to the cable connecting part.

Whether the vehicle is supposed to be supplied with a cooling medium via the charging cable during charging is preferably decided by a control unit of the vehicle. If the vehicle has no devices for cooling energy stores, for example, the valve means of the cable connecting part would carry the cooling medium only through the cable connecting part and back through the charging cable as standard. If a vehicle has the opportunity for cooling, on the other hand, it can request this when necessary. This is effected by means of a control unit of the vehicle. In one embodiment of the present disclosure, the valve means of the cable connecting part are actuatable by a control unit of the vehicle via a communication connection, for example. In particular, the valve means of the cable connecting part are actuatable via a push rod in this case.

When a vehicle requests cooling, it opens valve means inside its connecting body first of all and, after a delay, the valve means inside the cable connecting part. In this way, the circulation of the cooling medium is expanded to the vehicle. Before the vehicle is decoupled from the charging cable, this takes place in reverse. The vehicle first of all closes the valve means on its connecting body and prevents a further flow of cooling medium to the vehicle. The cooling medium that is then in the vehicle is completely aspirated through the charging cable before the valve means in the cable connecting part are likewise closed. As such, the circulation of the cooling medium is again restricted to the charging cable.

In an associated charging station, the cooling medium is preferably carried in circulation and itself cooled after passing through the charging cable. To this end, a cooling unit can be used on the charging station. Cooling by means of a heat exchanger using the ambient air would also be possible. After a vehicle is charged, the charging cable can be flushed with compressed air in order to remove cooling medium from the charging cable.

Further advantages, special features and expedient developments of the present disclosure emerge from the subclaims and the depiction of preferred exemplary embodiments below with reference to the figures, in which:

The charging cable system according to the present disclosure has a charging cable that is attached to a charging station for electrically operable vehicles. The charging station is connected to an energy source, from which current is transferrable to a vehicle via the charging cable. To this end, the charging cable is temporarily connected to the vehicle, this being done by means of a suitable plug/socket connection. By way of example, the charging cable has a cable connecting part formed on it, which is connectable to a connecting body of the vehicle. The cable connecting part is referred to as a charging plug below, while the connecting body of the vehicle is referred to as a charging socket. The connecting parts may also be shaped the other way round, however, so that the cable connecting part is shaped as a charging socket while the connecting body of the vehicle is a charging plug.

Figure 1:
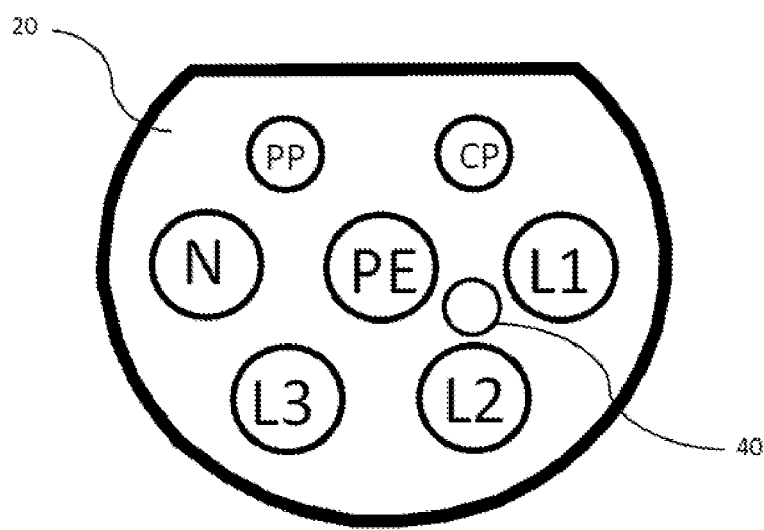
FIG. 1 shows a schematic front view of the connecting side of a charging plug.

FIG. 1 shows a front view of a cable connecting part 20 of this kind, the connecting side of which has contacts formed on it for various single lines. The connecting body to be connected on the vehicle has corresponding contacts that are brought into electrical contact when the two components are connected. In the embodiment of FIG. 1, there is provision for multiple power lines for the charging current L1, L2, L3, a neutral line N and a protective line PE, for example. Further, there is in the charging cable a pilot signal line CP (control pilot) for transferring pilot signals and what is known as a plug present line (PP), by means of which an electric vehicle can indicate a charging station whether or not a charging cable having a plug is plugged in.

Preferably, at least the power lines L1, L2, L3 are twisted inside the charging cable. However, the contacts of these single lines are on the connecting side of the cable connecting part 20, for example, as depicted, since this arrangement and the dimensions are standardized. Between the contacts of the single lines, there is the open end of a cooling duct 40, which is in the form of a hose, for example, inside the charging cable.

Figure 2:
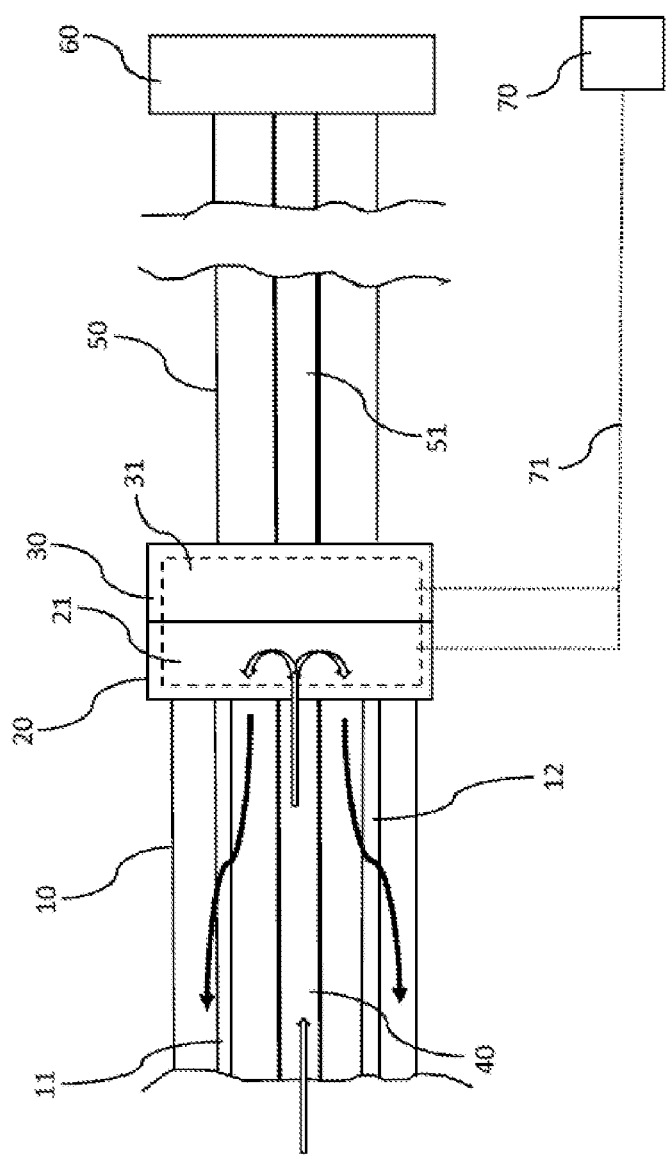
FIG. 2 shows a schematic depiction of an embodiment of a charging cable system according to the present disclosure without cooling for a connected vehicle.

FIG. 2 shows a schematic depiction of a charging cable 10 having a charging plug 20. Depicted in exemplary fashion inside the charging cable 10 are two single lines 11 and 12 that run to the charging plug 20. Between these single lines 11, 12, there is a cooling duct 40, which likewise runs to the charging plug 20 and joins it. This cooling duct 40 can carry a cooling medium to the charging plug 20, this feed direction being denoted by a white arrow.

The charging plug 20 is connected to a charging socket 30 of a vehicle. This connection is depicted only schematically in FIG. 2 and can be implemented in a known manner. From the charging socket 30 of the vehicle, a connecting line 50 leads to an energy store 60 of the vehicle. Charging current can be routed from the charging socket 30 to the energy store 60 likewise by multiple single lines (not depicted). Further, there may likewise be interposed components that are not depicted, such as a battery management system (BMS).

When the energy store 60 of the vehicle is being charged, cooling medium is carried through the cooling duct 40 to the charging plug 20 and, in a first mode of operation, is returned to the charging cable 10 by valve means 21 of the charging plug 20. This return is depicted by curved arrows in FIG. 2. Depending on the type of valve, the stream of the cooling medium accordingly runs inside the valve means 21. The charging plug 20 is closed off from the charging socket 30 in this mode of operation, so that the cooling medium is carried in the circulation only inside the charging cable 10 and the charging station, cooling the charging plug 20 and the charging cable 10. Following the return in the charging plug 20, the cooling medium flows around the single lines 11, 12, this being depicted by multiple curved arrows in FIG. 2. The cooling medium flows around the single lines 11, 12, to which end there is sufficient space between the single lines 11, 12.

The valves means 31 of the charging socket 30 of the vehicle are preferably connected to a control unit 70 of the vehicle via a communication connection 71. This control unit 70 can be used by the vehicle to open and close the valve means 31 when necessary. The communication connection 71 also connects the control unit to the valve means 21 of the charging plug 20 or to mechanical means that can be used to actuate the valve means 21. These can be a push rod, for example.

If the vehicle has means for cooling the energy store 60 or other components of a battery system, there may be provision for a cooling supply line 51 on the charging socket 30. This cooling supply line 51 can run in the region of the connecting line 50, but it can also branch off from the charging socket 30 inside the vehicle. In any case, the cooling supply line 51 leads to the energy store 60 or another component of the vehicle and can be used to supply cooling medium. To this end, the cooling supply line 51 can be connected to the cooling duct 40 of the charging cable 10 by means of appropriate shaping of the valve means 31 and 21.

Figure 3:
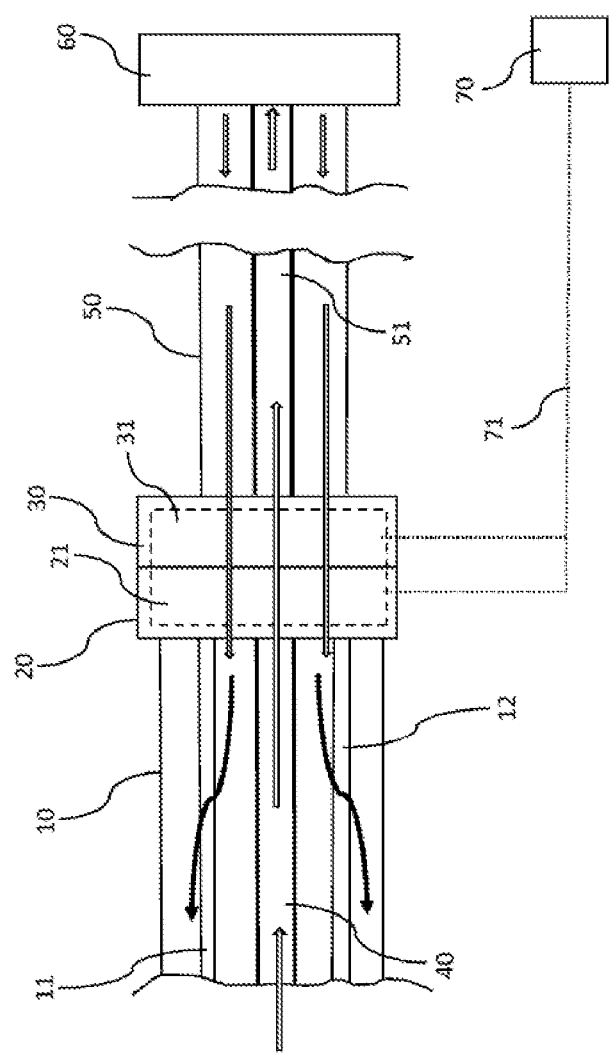
FIG. 3 shows the charging cable system shown in FIG. 2 with cooling for a connected vehicle.

When the vehicle requires cooling, it uses the control unit 70 to actuate the valve means 21 and 31 such that the cooling medium from the cooling duct 40 of the charging cable 20 is not returned inside the charging plug 20 but rather flows into the cooling supply line 51. Preferably, this involves the valve means 31 of the charging socket 30 of the vehicle being opened first of all and, after a delay, the valve means 21 of the charging plug 20 of the charging cable 10 being actuated. FIG. 3 shows this mode of operation by virtue of the feed of the cooling medium through charging plug 20 and charging socket 30 being denoted by a continuous white arrow. After cooling the energy store 60, for example, the heated cooling medium (black arrows) is returned by the connecting line 50 to the charging socket 30 and the charging plug 20. The valve means 21 and 31 are accordingly actuated such that the heated cooling medium to pass through and is carried to the charging station by the charging cable 10. In so doing, it flows around the single lines 11, 12 as in the mode of operation in FIG. 2. At the charging station, the heated cooling medium is cooled and can be supplied to the cooling duct again.

At the end of the charging process, the control unit 70 uses the valve means 31 to shut off the inflow to the cooling supply line 51, so that no further cooling medium can flow in the direction of the energy store 60. Once the remaining cooling medium has been completely aspirated back to the charging cable 10, this return flow is also shut off in the valve means 31. Subsequently, the valve means 21 of the charging plug 20 is also actuated such that no cooling medium can escape from the charging plug 20 when the charging plug 20 is removed from the charging socket 30.

The invention claimed is:

1. A charging cable system, having a charging cable with multiple single lines running inside the charging cable for transferring a charging current and with a cable connecting part for connecting the charging cable to the energy store of an electrically operable vehicle;
   wherein inside the charging cable runs at least one cooling duct in which a cooling medium is carried to the cable connecting part, and there is provision in the cable connecting part for valve means for returning the cooling medium back into the charging cable, wherein the charging cable is embodied such that the cooling medium flows around at least part of the single lines after its return from the cable connecting part back into the charging cable so that the cooling medium flows around at least part of the single lines within the charging cable.

2. The charging cable system of claim 1, wherein the single lines are twisted inside the charging cable.

3. The charging cable system of claim 1, wherein the cooling medium is electrically nonconductive.

4. The charging cable system of claim 1, wherein a respective insulation of the single lines is embodied in contoured fashion.

5. The charging cable system of claim 4, wherein a respective insulation of the single lines is provided with longitudinal grooves.

6. The charging cable system of claim 1, wherein the cooling medium is chosen from a group of fluids whose viscosity increases when heated.

7. The charging cable system of claim 1, wherein the cable connecting part is temporarily connectable to a connecting body of a vehicle, wherein this connecting body is connected to the energy store of the vehicle for the purpose of transferring a charging current via an electrical connecting line, and the valve means of the cable connecting part is of a form such that when the valve means is in a first configuration it routes the cooling medium back to the charging cable and when the valve means is in a second configuration it routes the cooling medium through the cable connecting part to the connecting body of the vehicle.

8. The charging cable system of claim 7, wherein the connecting body is designed to carry heated cooling medium from the vehicle through the connecting body to the cable connecting part.

9. The charging cable system of claim 1, wherein the valve means of the cable connecting part is actuatable by a control unit of the vehicle via a communication connection.

10. The charging cable system of claim 9, wherein the valve means of the cable connecting part is actuatable via a push rod.

11. A charging cable system, having a charging cable with multiple single lines running inside the charging cable for transferring a charging current and with a cable connecting part for connecting the charging cable to the energy store of an electrically operable vehicle;

wherein inside the charging cable runs at least one cooling duct in which a cooling medium is carried to the cable connecting part, and there is provision in the cable connecting part for valve means for returning the cooling medium back into the charging cable, wherein the charging cable is embodied such that the cooling medium flows in contact with at least part of the single lines after its return from the cable connecting part back into the charging cable.

12. The charging cable system of claim 11, wherein the single lines are twisted inside the charging cable.

13. The charging cable system of claim 11, wherein the cooling medium is electrically nonconductive.

14. The charging cable system of claim 11, wherein a respective insulation of the single lines is embodied in contoured fashion.

15. The charging cable system of claim 14, wherein a respective insulation of the single lines is provided with longitudinal grooves.

16. The charging cable system of claim 11, wherein the cooling medium is chosen from a group of fluids whose viscosity increases when heated.

17. The charging cable system of claim 11, wherein the cable connecting part is temporarily connectable to a connecting body of a vehicle, wherein this connecting body is connected to the energy store of the vehicle for the purpose of transferring a charging current via an electrical connecting line, and the valve means of the cable connecting part is of a form such that when the valve means is in a first configuration it routes the cooling medium back to the charging cable and when the valve means is in a second configuration it routes the cooling medium through the cable connecting part to the connecting body of the vehicle.

18. The charging cable system of claim 17, wherein the connecting body is designed to carry heated cooling medium from the vehicle through the connecting body to the cable connecting part.

19. The charging cable system of claim 11, wherein the valve means of the cable connecting part is actuatable by a control unit of the vehicle via a communication connection.

20. The charging cable system of claim 19, wherein the valve means of the cable connecting part is actuatable via a push rod.

\* \* \* \* \*